United States Patent [19]

White et al.

[11] 4,327,150

[45] Apr. 27, 1982

[54] METHOD OF BONDING PLASTICIZED ELASTOMER TO METAL AND ARTICLES PRODUCED THEREBY

[75] Inventors: William T. White, Huntsville; Johnny M. Clemons, Trinity; Frank E. Ledbetter, III, Huntsville, all of Ala.

[73] Assignee: The United States of America as represented by the Administrator of the National Aeronautics and Space Administration, Washington, D.C.

[21] Appl. No.: 218,585

[22] Filed: Dec. 19, 1980

[51] Int. Cl.³ .................... B32B 15/06; B32B 15/08; C09J 5/04
[52] U.S. Cl. .................................. 428/332; 156/315; 156/338; 428/339; 428/462; 428/466; 428/493
[58] Field of Search ............ 428/457, 462, 466, 332, 428/493, 339; 156/315, 338; 260/4 R

[56] References Cited

U.S. PATENT DOCUMENTS

| | | | |
|---|---|---|---|
| 1,732,886 | 10/1929 | Gray | 428/466 |
| 1,749,824 | 3/1930 | Lord | 428/466 |
| 2,144,495 | 1/1939 | Humphrey | 428/462 |
| 3,108,035 | 10/1963 | Rappaport et al. | 428/466 |

*Primary Examiner*—Thomas J. Herbert, Jr.
*Attorney, Agent, or Firm*—Leon D. Wofford, Jr.; John R. Manning; Joseph H. Beumer

[57] ABSTRACT

Plasticized elastomer is securely bonded to a metal surface by interposing between the adhesive-coated metal surface and the elastomer a sheet of material obtained by combining adhesive with a portion of the elastomer that has been treated to remove plasticizers therefrom and heating the assembly in a mold under pressure. The sheet material is made up by dissolving a portion of the plasticized elastomer in an organic solvent, casting the solution, exposing it to a vacuum to remove the solvent and plasticizers, dissolving the deplasticized material in liquid adhesive and casting and drying the resulting liquid.

5 Claims, No Drawings

METHOD OF BONDING PLASTICIZED ELASTOMER TO METAL AND ARTICLES PRODUCED THEREBY

ORIGIN OF THE INVENTION

The invention described herein was made by employees of the U.S. Government and may be manufactured and used by or for the Government of the United States for governmental purposes without the payment of any royalties thereon or therefor.

TECHNICAL FIELD

This invention relates to bonding of rubber and rubber-like elastomers to metal and more particularly to bonding of plasticized elastomers to metal.

BACKGROUND ART

Many applications exist for seals, gaskets, flexible supports and the like having soft rubber or rubber-like elastomer bonded to a metal substrate. For example, in the Space Shuttle program exhaust nozzles of solid-fuel rocket motors utilize flex seals of plasticized elastomer bonded to surfaces of the nozzles. A strong, high-quality bond is required to withstand the severe environments to which such seals are subjected in their operating life. Bonding of elastomer to the metal surface for this purpose has been carried out by cleaning the metal surface, applying a primer and an adhesive and pressing the elastomer to the adhesive while heating at 300° F. for one hour. The bond obtained by such procedure frequently has failed under pressure or other loads owing to weakness resulting from diffusion of plasticizing agents into the adhesive layer during bonding.

Various prior patents disclose bonding processes in which a thin film of rubber or rubber-like material is interposed between a metal surface and a rubber article being joined to the surface. U.S. Pat. No. 1,732,886 discloses application of a film of tacky, thermoplastic rubber isomers to the metal, heating the film and vulcanizing a rubber composition in contact with the film. In U.S. Pat. No. 1,749,824 after a layer of cement is applied to the metal, a series of layers containing a mixture of cement and rubber is applied, each successive layer being made up to contain more rubber and less cement. The rubber article is then bonded to the last, rubber-rich layer. U.S. Pat. No. 2,144,495 discloses use of an intermediate film of synthetic drying oils mixed with rubber stock in solution. The film is applied, and rubber is bonded thereto by means of a second coating that adheres both to the film and the rubber. None of these patents is concerned with soft rubber in the form of modern-day plasticized elastomers or with prevention of diffusion of plasticizers into an adhesive bonded joint.

DISCLOSURE OF THE INVENTION

In accordance with the present invention soft rubber or rubber-like material in the form of a plasticized elastomer is bonded to a metal surface by a method which includes the step of interposing a layer of unplasticized adhesive-containing material between the adhesive coated metal and the plasticized elastomer. The unplasticized, adhesive-containing layer is securely bonded to both the adhesive and the plasticized elastomer, diffusion of plasticizer from the elastomer into the adhesive being prevented by the layer. The resulting bond exhibits high strength and stability such that limitations on use of the bonded article are determined by the properties of the elastomer itself rather than by the bond.

It is therefore an object of the invention to provide an improved method of bonding plasticized elastomers to metal.

Another object is to provide a method of bonding plasticized elastomers to metal wherein diffusion of plasticizers into the bonding adhesive is prevented.

Still another object is to provide a composite article having a metal substrate and a plasticized elastomeric body securely bonded to the substrate.

Other objects and advantages of the invention will be apparent from the following detailed description.

DETAILED DESCRIPTION OF THE INVENTION

The term "plasticized elastomer" as used herein is intended to mean soft, pliable rubber or rubber-like material containing natural or synthetic rubber polymers and a plasticizer, or softening agent. Plasticized elastomers are typically formulated to include a natural rubber polymer such as cis-1, 4-polyisoprene or a synthetic polymer such as neoprene or synthetic polyisoprene in conbination with one or more of the following plasticizers: fatty acids, vegetable oils, mineral oils, pine products, coal tar products, parafimmic oils or aromatic oils. In addition to the polymer and plasticizer, various other commonly used additives may be included in elastomer compositions bonded by the present invention. Such additives may include: sulfur (a rubber-crosslinking agent), zinc oxide (accelerator activator), stearic acid (accelerator activator), carbon powder (pigment), and N-Cyclohexyl Benzothiazole-2-Sulfenamide (accelerator).

Prior to application of the unplasticized, adhesive-containing layer, the metal surface is prepared and a primer and adhesive are applied using conventional techniques. A suitable surface preparation procedure includes the steps of abrading the surface by means such as sandblasting and washing the abraded surface with an organic solvent with a high vapor pressure such as ethyl alcohol. A primer is then applied to the prepared surface. The primer is selected depending on the composition of metal surface. For stainless steel and aluminium a chlorimated rubber resin primer available under the trade name Chemlok 205 may be employed. After application of a thin coating of the primer, a thirty minute drying period is allowed. An adhesive is applied to the primed surface, with a chlorimated rubber resin adhesive available under the trade name Chemlok 220 being preferred. Other types of adhesives such as polyisocyanates, phenylisocyanates or butyl rubber resin may also be used. After application in a thin layer the adhesive is allowed to dry for an hour.

The unplasticized, adhesive-containing layer to be interposed between the adhesive layer and the plasticized elastomer being bonded may be based on the same polymeric material as the elastomer, but without the plasticizers that give the elastomer its pliable character. A suitable unplasticized polymeric material may be obtained by milling a portion of the plasticized elastomer, dissolving the milled material in a solvent such as toluene, casting the solution on a flat surface and subjecting the solution to a vacuum for a period of at least 1.5 hours whereby plasticizers are removed by volitilization.

After removal of plasticizers, the remaining elastomer material is combined with an adhesive, preferable of the same composition as the adhesive applied to the metal surface. A sufficient amount of adhesive is used to obtain a castable liquid, the solid elastomer residue dissolving in the adhesive. About 20 parts by volume adhesive per 10 parts elastomer residue is suitable for this purpose. The resulting adhesive-containing solution is then cast on a flat surface, and the cast material is allowed to dry for a period of at least 12 hours, producing a sheet of solid material. Preparation conditions are controlled to produce a sheet thickness of at least 25 mils and preferable 30 mils to provide an effective barrier to diffusion of plasticers in the subsequent bonding step.

The dried, adhesive-containing sheet is then placed between the adhesive-coated metal and the plasticized elastomer, and the assembly is heated in a mold under pressure to form a bonded joint. Suitable bonding conditions include a temperature of 275° F. to 325° F. and a mold pressure of 2000 to 2500 psi for a period of one-hour. Bonded articles obtained by this procedure show a higher strength in the bond than in the body of the elastomer so that quality of the bond is no longer a limiting factor in use of the bonded article.

The invention is further illustrated by the following example.

EXAMPLE

Two stainless steel (SS 304) discs two inches in diameter and one-half inch thick were prepared for bonding by sandblasting the bonding surfaces for three minutes. The surfaces were then washed with toluene and rinsed with acetone or ethyl alcohol. A layer of chlorinated rubber resin metal primer, available commercially under the trade name Chemlock 205, was applied to the cleaned surfaces and was allowed to dry for thirty minutes. A layer of chlorinated rubber resin adhesive, available commercially under the trade name Chemlok 205 was then applied onto the primed surface. An adhesive-containing elastomer-residue layer was prepared by milling and dissolving in toluene a plasticized elastomer available under the trade name Norsorex and having the following composition in parts by weight: polynorborene polymer, 100; aromatic oil, 180: parafinnic oil, 20; N-300 HAF Black (carbon black), 200; stearic acid,1; Cypac (N-Cyclohexyl Benzothiazole-2-Sulfenamide) accelerator, 5; and sulfur, 1.5. The solution was then poured on a flat metal foil surface and exposed to a vacuum for 1.5 hours, the volatile components being removed and a solid sheet of unplasticized elastomer residue remaining. The sheet material was then combined with adhesive of the same composition applied to the primed surface and the resulting mixture was cast on a flat metal surface and left to dry overnight at room temperature. The resulting adhesive-contining sheet was cut to fit the metal surface and placed between the adhesive coated layer of the metal and a plasticized elastomeric body of the same composition as used in preparing the sheet. The assembly was then placed in a mold and heated at 300° F. for one hour at a mold pressure of 2,5000 psi. The bonded metal elastomer article was then removed from the mold and subjected to stress testing in an Instron stressing system wherein stress was applied until the metal-elastomer article broke. In each case the bond remained intact, while the plasticized elastomeric body was torn apart within the elastomer itself. No tearing apart of elastomer from the metal surface was observed.

The above example is merely illustrative and is not to be construed as limiting the scope of our invention, which is limited only as indicated by the appended claims.

We claim:

1. The method of bonding a plasticized rubber elastomer body to a metal surface which comprises:
   (a) applying a primer to the metal surface;
   (b) applying an adhesive to the resulting primed surface;
   (c) dissolving a portion of said plasticized rubber elastomer in an organic solvent;
   (d) removing the plasticizers from the resulting solution;
   (e) combining the resulting de-plasticized rubber elastomer with a portion of said adhesive to produce a liquid;
   (f) casting the resulting liquid on a flat surface and allowing the cast material to dry so as to produce a sheet of deplasticized, adhesive-containing material;
   (g) disposing said sheet between and in contact with the adhesive-coated metal surface and the plasticized rubber elastomer body; and
   (h) heating the resulting assembly under pressure until said sheet is bonded to said surface and said body.

2. The method of claim 1 wherein the assembly is heated in a mold at a temperature of 275° F. to 325° F. and a pressure of 2000 to 2500 psi.

3. The method of claim 2 wherein said sheet is at least 25 mils thick.

4. The method of claim 3 wherein about 20 parts by volume of adhesive are combined with 10 parts de-plasticized material in forming said sheet.

5. A bonded article comprising a metal substrate having adhesively bonded thereto a sheet comprising a mixture of adhesive and de-plasticized rubber elastomeric material and a rubber elastomeric body adhesively bonded to said sheet.

* * * * *